Patented Feb. 6, 1945

2,369,037

UNITED STATES PATENT OFFICE 2,369,037

PROCESS FOR THE DEHYDRATION AND CALCINATION OF POTASH ALUM

Gino Gallo, Pisa, Italy; vested in the Alien Property Custodian

No Drawing. Application September 7, 1940, Serial No. 355,830. In Italy August 29, 1939

1 Claim. (Cl. 23—121)

It is known that potash alum in crystals with 24 molecules of water and containing 45.56% of water, when subjected to heat melts rapidly at 92° C. in its water of crystallization, giving origin to a most mobile liquid which, with the rising of temperature, becomes gradually viscid and forms a sticky mass difficult to handle. With a further rise of temperature, the parts nearer to the heated surface dry up and become a porous or spongy mass which constitutes the ordinary burnt alum. Finally, at about 500°, the sulphate of aluminium begins to dissociate into oxide of aluminium and sulphuric-sulphurous anhydride, till at a temperature of about 1000° C. the dissociation is complete and there remains only a mixture of potassium sulphate and of aluminium oxide.

In numerous experiments made in connection with the present invention, it has been noted that during this last period there is formed, as an intermediate product, also a certain quantity of potassium bisulphate, which, owing to its low melting point (about 200° C.) flows rapidly out of the porous mass of alum and is absorbed by the refractory material. This phenomenon is due as was already proved by the inventor, to the fact that the alum, a very bad conductor of heat, withholds strongly in the internal part of its mass a certain quantity of water of crystallization and, when the temperature of the external mass reaches the point of dissociation of the aluminium sulphate and there begins to form sulphuric anhydride, the latter, in contact with the water still present in its interior causes the formation of sulphuric acid, which, with the potassium sulphate with which it comes into close contact, forms potassium bisulphate easy to melt.

All those facts partly known and partly investigated and explained by the inventor render particularly difficult and complicated the calcination of big masses of potash alum on an industrial scale.

The present invention purports to overcome such difficulties and has for its object a new process for the dehydration and the calcination of potash alum, which permits the industrial calcination of large masses of said alum.

In accordance with the previous Italian Patent No. 351,651, the potash alum may be obtained in most minute crystals by causing its crystallization in a stirring apparatus.

Such minute crystals are, under this process, subjected to drying at a temperature of 75° C., in an air current within a mixing apparatus. In consequence of the drying they lose about 30% of water within the space of 5 to 6 hours, whereby they are transformed into the salt with 6 molecules of water of crystallization, which salt, while maintaining its powdery structure, no longer melts at 92° C.

The salt may, therefore, be subsequently heated for a period of 2 to 3 hours, at a temperature of 250-300° C., in a current of air so as to obtain the complete dehydration of the alum. Also this operation, as the preceding one, is carried out by stirring the material so as to make it maintain its initial structure of loose powder and to facilitate the complete dehydration of the alum.

The anhydrous alum is then brought up to a gradually increasing temperature until it reaches 800-850° in a period of 6 to 8 hours, the material being continuously stirred in a muffle, while provision is made for the suction of the sulphurous gases in order to facilitate the dissociation of the aluminium sulphate.

During all these successive operations the material retains its loose powder structure, and thus are facilitated both the dehydration of the alum and the dissociation of the aluminium sulphate.

What I claim is:

A process for dehydrating and calcining potash alum to obtain a uniform and homogeneous product which comprises dehydrating the alum as a fine crystalline powder in a current of air, while agitating, at a temperature of about 75° C. for a period of approximately 5 to 6 hours to remove approximately 30% of water, whereby a potash alum salt containing 6 molecules of water of crystallization is produced, heating said salt at a temperature of 250 to 300° C. for a period of 2 to 3 hours to substantially remove all the remaining water of crystallization while agitating said salt to maintain its pulverulent form, and finally calcining the resulting anhydrous salt by heating the same gradually to a temperature of 800 to 850° C., while stirring, to effect complete disassociation of the aluminum sulphate in said salt.

GINO GALLO.